Aug. 2, 1966   A. H. FISKE, JR   3,263,487
PIVOTALLY MOUNTED OPERATING HEAD
Filed April 14, 1964   2 Sheets-Sheet 1

INVENTOR.
AUGUSTUS H. FISKE, JR.
BY
Russell, Chittick & Pfund

Aug. 2, 1966  A. H. FISKE, JR  3,263,487
PIVOTALLY MOUNTED OPERATING HEAD
Filed April 14, 1964  2 Sheets-Sheet 2

INVENTOR.
AUGUSTUS H. FISKE, JR
BY
Russell, Chittick & Pfund 3,263,487
PIVOTALLY MOUNTED OPERATING HEAD
Augustus H. Fiske, Jr., West Redding, Conn., assignor to Fiske Associates, Inc., Bethel, Conn., a corporation of Massachusetts
Filed Apr. 14, 1964, Ser. No. 359,604
7 Claims. (Cl. 73—17)

This invention relates to apparatus for measuring the freezing point depression produced by solutes in a liquid solvent, and more particlarly to an improved operating head for such apparatus.

It is well known that the addition of solutes to a liquid solvent will generally depress the freezing point of the solvent and that the freezing point is normally proportional to the concentration of the solutes in the solvent. These two physical characteristics of solutions form the basis of cryoscopy i.e., the determination of the molecular weight of a substance by observing the lowering of the freezing point of a suitable solvent. The principles of cryoscopy are utilized in a variety of industrial situations to provide an indirect measurement of properties other than the molecular weight of a substance. For example, in the diary industry the water content or dilution of dairy products, such as milk, is ascertained by a cryoscope which measures the freezing point of a sample of the product. If the dairy product has been diluted with water, this fact will be readily apparent from the higher than normal freezing point of the test sample.

The phenomenon of freezing point depression is also used in the field of medical research where it forms the basis of a laboratory method of analysis for determining the total osmotic pressure of different body fluids. The laboratory instrument which measures the total osmotic pressure of body fluids by the freezing point depression method is called an "osmometer." Osmometers are calibrated to read directly in terms of osmotic pressure units e.g., milliosmols, as opposed to cryoscopes which provide a sample freezing point readout in temperature units, such as, degrees centigrade. Conceptually, however, the two instruments are substantially identical because they both sense the same property of the sample solution, that is, the equilibrium or freezing point temperature of the solution.

The cryoscope and osmometer both perform the same sequence of operations in establishing the freezing point temperature for the particular measurement sample even though the samples may be as dissimilar as milk and blood. In each instrument, the sample solution is gently cooled to a predetermined temperature below its normal freezing point. When the sample solution reaches the desired supercooled temperature, nucleation is induced in the sample by any one of the well known methods, such as, seeding, mechanical shock or ultrasonic vibrations. The formation of ice crystals in the solution releases the latent heat of crystallization of the water thereby causing a rise in the temperature of the solution. Since the crystallization process does not occur instantaneously, a time versus temperature diagram of the solution will display a curve which rises sharply and then flattens out into a temperature plateau which represents the equilibrium temperature or observed freezing point of the sample. The observed freezing point of the test sample can then be compared with the freezing points of known solutions to determine the desired information, e.g., the degree of water dilution of the dairy product or the osmotic pressure of the body fluid. The rather cumbersome procedure of comparing the test sample reading with readings from known solutions is normally avoided by initially calibrating the particular instrument against known solutions so that the instrument readout can be made directly in terms of the desired information e.g., total osmotic pressure.

The construction of instruments which perform cryoscopic or osmotic measurements are well known to those in the art, and therefore, need not be described in detail. However, certain generalizations concerning the components of these instruments are pertinent at this time in view of the nature of the present invention as an improvement over existing equipments. It has already been noted that the measurement procedures and functions of cryoscopes and osmometers are substantially identical and, as would be expected, the components of both instruments also display a similar identity.

Each instrument has a means for cooling the test sample below its normal freezing point to establish a supercooled or metastable equilibrium. In addition, both instruments also have means for inducing nucleation in the sample and means for measuring the equilibrium temperature or freezing point of the sample. Instruments of this type usually reduce the temperature of the sample to the desired supercooled temperature by circulating a liquid coolant through a cooling bath in which is immersed a test tube containing the measurement sample. In order to prevent premature freezing of the sample at a temperature above the desired supercooled temperature, the test sample is gently stirred by vibratory rods both during and after the transistion from a cooled to a supercooled state. When the measurement sample reaches the predetermined supercooled temperature, nucleation is induced in the test sample by increasing the amplitude of vibration of the stirring rods until the rods strike the inner wall of the test tube thereby causing a mechanical shock which initiates the ice crystallization process.

The equilibrium or freezing point temperature of the sample is determined by a temperature sensitive electrical transducer such as, for example, a thermistor, which is immersed in the sample solution. The temperature transducer normally forms one arm of a Wheatstone bridge circuit which is balanced at a predetermined temperature. Any change in the temperature of the test sample from the reference or bridge balanced temperature will unbalance the bridge thereby causing a current to flow through the bridge galvanometer. The magnitude and polarity of the current flow provides an indication of the amount and direction of the temperature change. If the galvanometer is calibrated in terms of freezing point temperature or total oscotic pressure, the galvanometer deflection will then provide a direct readout of the desired information.

In existing equipments the temperature transducer and vibratory stirring rods are generally mounted as a complete probe unit on a vertically adjustable operating head which can be rotated in a horizontal plane from a sample changing position to a sample measuring position. When the operating head is in the sample changing position, the probe unit is laterally displaced from the cooling bath and accessible to the operator for changing test tubes. Starting with the operating head in the sample measuring position, the operator must perform the following sequence of operations for each sample which is measured on the freezing point depression apparatus. First, assuming that a predetermined quantity of the sample solution has been transferred to the sample test tube, the test tube is detachably secured to the operating head by sliding the tube over the probe unit until the tube engages a test tube holder mounted on the operating head. If the test tube is properly secured in the tube holder, the probe unit will extend sufficiently far down into the test tube so that the temperature transducer and stirring rods are partially immersed in the sample solution. The operating head and test tube are then rotated horizontally until the test tube is located immediately above the cooling bath and in alignment with a test tube receptacle mounted in the cooling bath. The operating head is then lowered to the sample measuring position in which a predetermined portion of the test tube is immersed in the cooling bath. After the desired measurements have been obtained, the operating head and test tube are lifted out of the cooling bath and rotated back to the sample changing position. The test tube can then be removed from the operating head by disengaging the tube from the test tube holder and sliding the tube over the probe unit. It is important to note that this sequence must be repeated for every sample which is measured on the freezing point depression apparatus.

Thus, although the operating head described above is satisfactory from the standpoint of performing the necessary operations for obtaining the desired sample solution measurements, it has certain disadvantages in terms of operator convenience, but even more important than operator inconvenience, the construction of the operating head also significantly increases the risk of accidental damage to the equipment. These two disadvantages are interrelated and stem essentially from the requirement of sliding the sample test tube over the delicate probe unit on two separate occasions during each sample measurement. This procedure, which is dictated by the particular construction of the operating head, is not only at best cumbersome, but it also repeatedly exposes the sensitive and fragile temperature transducers to the possibility of accidental damage or breakage.

It is accordingly, an object of the present invention to provide an improved operating head for freezing point depression apparatus which significantly reduces the chances of accidental damage to the probe unit and at the same time facilitates the rapid and accurate measurement of a number of sample solutions.

In the accomplishment of this object, I provide an operating head which comprises a probe arm having one end thereof pivotally secured to the measuring apparatus for rotation only in a vertical plane and within certain predescribed limits. The transducer-stirring rod probe unit is mounted on the distal end of the probe arm together with a test tube holder. This construction of the operating head allows the operator to place the sample test tube directly into the test tube receptacle in the cooling bath, instead of having to slide the test tube over the probe unit as is the case in prior art equipments. The probe arm can then be swung downwardly into a horizontal or sample measuring position in which the probe unit is positioned within the test tube and partially immersed in the sample solution. The possibility of the probe unit being accidentally damaged by contact with the walls of the test tube is completely eliminated because the placement of the test tube in the cooling bath can be accurately controlled so that the probe unit will be positioned in the center of the test tube each time the probe arm is swung downwardly into the sample measuring position.

It is another object of the present invention to provide an improved operating head which is spring-loaded to have two neutral positions: a horizontal sample measuring position and a substantially vertical sample changing position.

It is a feature of the present invention that the measurement procedure employed with the novel improved operating head affords a greater degree of operator convenience than was possible with existing freezing point depression apparatus and a concomitant reduction in the time required for loading and unloading sample test tubes from the operating head.

It is also a feature of the present invention that the flexing and twisting of the electrical leads which run from the transducer to the measurement circuitry is appreciably decreased because the movement of the operating head is restricted to one plane.

These and other objects and features of the present invention will best be understood from a more detailed description of a preferred embodiment thereof, selected for purposes of illustration, and shown in the accompanying drawings in which.

Figure 1:
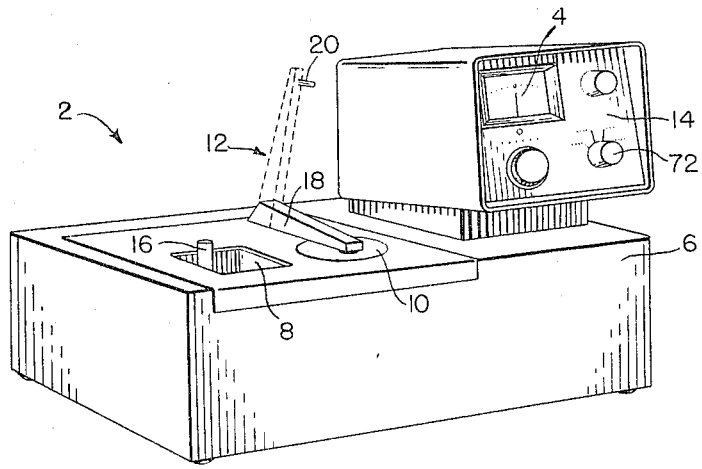
FIG. 1 is a perspective view of a freezing point depression apparatus showing an improved pivotally mounted operating head.

Turning now to the drawings, FIG. 1 depicts a freezing point apparatus indicated generally by the reference numeral 2. The apparatus shown in FIG. 1 can be either a cryoscope or an osmometer depending upon the initial calibration of the temperature measuring circuitry and the form of the information displayed on meter 4. For purposes of discussion, the freezing point depression apparatus 2 will be referred to hereinafter as a cryoscope, although it should be understood that the following description is applicable to either instrument.

The major components of the cryoscope are shown in the perspective view of FIG. 1 and are identified as follows: an instrument base 6; a sample pre-chill bath 8; a sample supercooling bath 10; an operating head indicated generally as 12; and an instrument control panel 14 which includes the previously mentioned readout meter 4. In addition to the major components which are visible in FIG. 1, the cryoscope 2 also has a coolant circulating system for removing heat from any object, such as, for example, a sample test tube 16, which is placed in either the pre-chill bath 8 or the supercooling bath 10.

Only one sample test tube 16 is shown in the pre-chill bath 8 in the interests of clarity, however, it will be appreciated that in actual operation a number of test tubes, each containing a measurement sample, would normally be placed in the pre-chill bath for subsequent transfer to the supercooling bath 10. The use of the pre-chill bath 8 greatly reduces the time required for each individual sample measurement because the supercooling bath 10 does not have to cool the sample from ambient temperature to the desired supercooled temperature.

The operating head, indicated generally as 12, includes a probe arm 18 which is pivotally mounted on the instrument base 6 for rotation in a vertical plane within predetermined limits. The two limits of probe arm rotation define a "sample measuring position" in which the probe arm 18 is approximately horizontal and a "sample changing position" in which the probe arm 18 is substantially vertical as indicated by the dotted lines in FIG. 1. It can be seen from the dotted position of the probe arm 18, and in greater detail in FIG. 2, that a probe unit 20 comprising a temperature transducer 22 and a vibratory stirring rod 24 is mounted on the distal end of the probe arm 18. The length of the probe arm 18, the mounting position of the probe unit 20 and the position of the supercooling bath 10 relative to the pivot point of probe arm 18 are carefully selected so that when the probe arm is rotated downwardly from the sample changing position to the horizontal sample measuring position, the probe unit 20 will be accurately positioned in the center of the sample test tube 16 and partially immersed in the sample solution 26.

Figure 2:
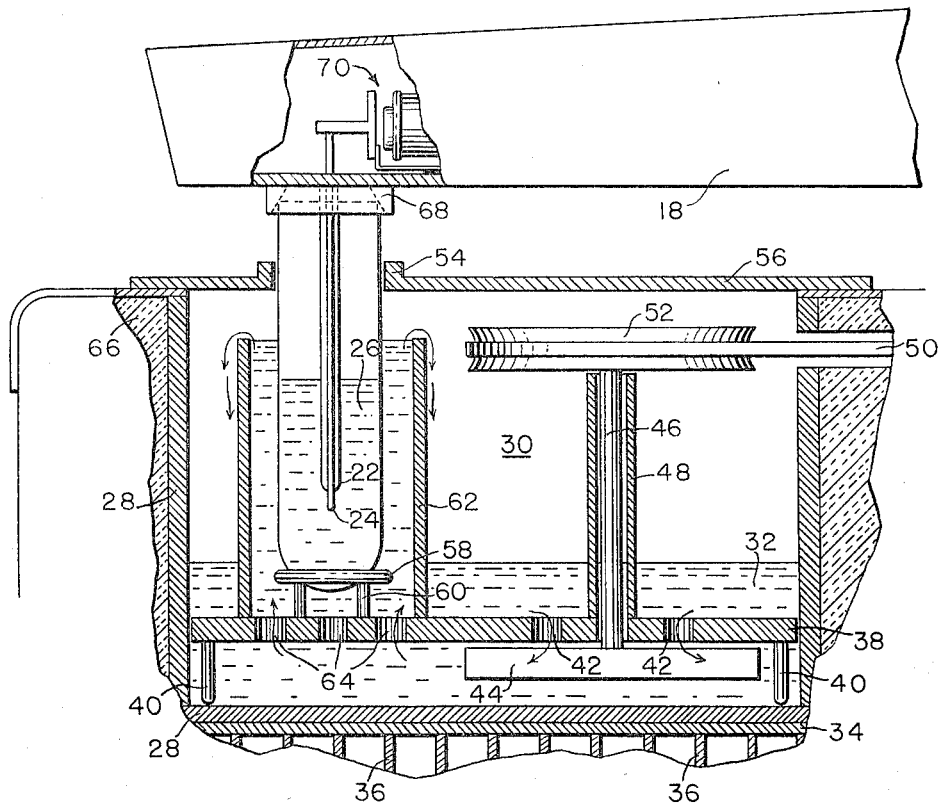
FIG. 2 is a side elevation in partial cutaway showing a cooling bath, probe unit and a portion of the operating head probe arm.

The spacial relationships of the probe unit 20 with respect to the test tube 16 and sample solution 26 are clearly depicted in the partial cutaway view of FIG. 2 which illustrates the structure of the supercooling bath 10 and the distal end portion of the probe arm 18. The supercooling bath 10 has a cylindrical wall member 28 which is closed at one end to form a coolant chamber 30. A suitable liquid coolant 32 fills a portion of the coolant chamber 30 and is circulated past the test tube 16 by pump means, hereinafter described, to cool the test tube and sample solution 26 to the desired supercooled temperature.

The coolant is maintained at a predetermined temperature by a thermoelectric cell 34 located beneath the bottom of the cylindrical wall member 28 and in thermally conductive contact therewith. The polarity of the potential applied to the thermoelectric cell 34 is such that the "cold" side of the thermoelectric junction is in contact with the bottom of the wall member 28. The heat removed from the sample 26, the test tube 16 and the coolant itself is dissipated from the thermoelectric cell 34 by forced air cooling of radiating fins 36.

It has already been mentioned that the measurement sample solution 26 and the test tube 16 are cooled by the forced circulation of the liquid coolant 32 past the test tube. The pump means and structural elements which establish this circulation pattern will now be discussed with reference to FIG. 2. A perforated, circular base plate 38 is located within the coolant chamber 30 and positioned, by means of legs 40, at a level intermediate of the bottom of the wall member 28 and the surface of the liquid coolant 32. The circular base plate 38 thus divides the coolant chamber 30 into an upper section and a lower section with the latter section forming a sump for the liquid coolant 32.

The liquid coolant 32 is drawn from the upper section down through perforations 42 into the coolant sump by the vortex action of a motor driven impeller 44. The impeller 44 is secured to one end of a drive shaft 46 journalled in a shaft housing 48 mounted on the upper surface of the base plate 38. Motive force for the drive shaft 46 is supplied by an electric motor, not shown, through a power transmission belt 50 to the drive shaft pulley 52.

Before discussing the coolant flow patterns created by the action of impeller 44, it will be helpful to briefly describe the structural elements which support and accurately position the test tube 16 in the cooling bath 10. It should be remembered at this point that the test tube 16 must be precisely located in the cooling bath 10 to insure the correct positioning of the probe unit 20 in the test tube 16 when the probe arm 18 is rotated downwardly into the sample measuring position. Any discrepancy in the position of the test tube 16 will allow the delicate probe unit 20 to strike, the test tube thereby negating an important advantage of the improved operating head.

In order to obtain the correct positioning of the test tube in the cooling bath, the test tube 16 is inserted in the bath through a collar 54 which is integrally formed in an insulative coolant chamber cover 56. Insulating cover 56 is secured to the instrument base 6 to prevent any movement relative to the coolant chamber 30 which would disrupt the ultimate alignment of the test tube and the probe unit. The test tube 16 is pushed downwardly through collar 54 until the bottom end of the test tube seats in an annular test tube support 58 which is positioned coaxially with respect to collar 54 and held above the upper surface of the base plate 38 by means of legs 60.

Test tube support 58 is located within a cylindrical member 62 which forms a coolant well for the test tube 16. The well member 62 overlies another set of perforating 64 in the base plate 38 which provide fluid communication between the interior or well portion of member 62 and the sump portion of the coolant chamber 30.

When the impeller motor is first energized, it will be apparent that the level of the coolant 32 inside the well member 62 and the coolant chamber 30 are the same. However, as the rotation of the impeller 44 continues, the level of the coolant inside of the well member 62 gradually rises until the coolant overflows from the well member 62 as shown by the arrows in FIG. 2. The overflow coolant is then drawn back into the sump by the vortex action of the impeller 44.

The circular coolant flow pattern established by the impeller 44 cools the test tube 16 and sample solution 26 to the desired supercooled temperature. It should be noted that the inner diameter of the circular support 58 is slightly less than the outer diameter of the test tube 16 so that the bottom of the test tube projects downwardly below the support 56. This arrangement permits the free circulation of coolant 32 around the bottom and sides of the test tube thereby increasing the total surface area of the test tube in contact with the coolant and, hence, providing a more rapid and uniform cooling of the sample solution 26.

If the sample solution 26 is to be affected only by the heat transfer patterns established by the thermoelectric cell 34, then the test tube 16 and coolant chamber 30 must be maintained in a thermally isolated state with respect to the surrounding environment. Thermal isolation can be achieved by the use of proper insulating materials positioned at the points which are vulnerable to heat transfer. For example, heat flow into the coolant chamber 30 is prevented by the insulating cover 56 which seals the open portion of the coolant chamber and by an insulating blanket 66 which surrounds the chamber walls 28. Both the cover 56 and blanket 66 should be formed from material which has as low a thermal transfer coefficient as possible, yet which also meets the structural requirements imposed by the functions of these elements.

The open, upper end of the test tube 16 is closed against heat flow into the tube by a "press-to-fit" test tube holder 68 which engages the test tube when the probe arm 18 is swung downwardly into the horizontal sample measuring position. It can be seen that the combined insulating effect of the cover 56, blanket 66 and test tube holder 68 provide the necessary thermal isolation to permit the sample solution 26 to be cooled to the desired supercooled temperature.

When the sample solution reaches the predetermined supercooled temperature, nucleation is induced in the sample solution by violently agitating the solution with the stirring rod 24. Sufficient vibratory force for the stirring rod 24 is obtained from an electrical vibrator 70 which is mounted within probe arm 18 and mechanically coupled to the stirring rod. Vibrator 70 is energized when function switch 72 (see FIG. 1) is rotated from a "cool" position to a "freeze" position. The scale of FIG. 1 does not permit the individual positions of the function switch 72 to be labeled, however, persons in the art will recognize the terminology of "cool" and "freeze" and understand the functions represented by these words.

Having described in general terms the major components of the cryoscope 2 and more specifically the cryoscope's liquid coolant circulating system and test tube positioning elements, I will now discuss the pivotal mounting means for the probe arm 18. The pivotal action of the probe arm has already been described, however, a brief review at this point will be helpful in understanding the following discussion of the probe arm pivotal mounting structure depicted in FIGS. 3 and 4.

It should be remembered that the probe arm 18 is pivotally mounted on the cryoscope base 6 for rotation only in a vertical plane within certain preselected limits which have been defined previously as the vertical sample changing position and horizontal sample measuring position. I have also mentioned previously that the test tube 16 must be accurately positioned in the cooling bath 10 to insure the correct alignment of the probe unit 20 with the test tube 16 when the probe arm 18 is swung downwardly into the sample measuring position. For this reason, the length of the probe arm 18, the location and length of the probe unit 20 and the relative location of the probe arm pivot point and the test tube positioning elements are carefully selected to achieve the necessary cooperative relationship between the above-mentioned components.

Figure 3:
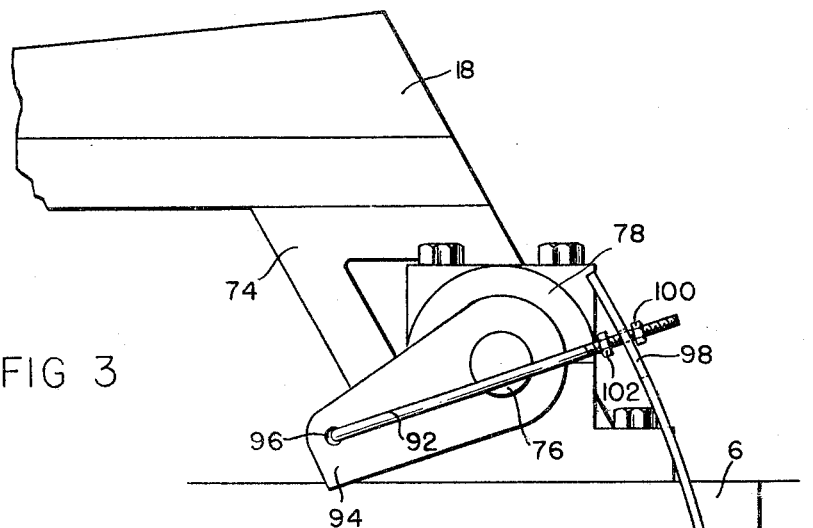
FIG. 3 is a side elevation showing the pivotal mounting structure of the operating head with the probe arm in the sample measuring position; and, FIG. 4 is a side elevation of the other side of the operating head pivotal mounting structure with the vertical sample changing position of the probe arm indicated by dotted lines.
Figure 4:
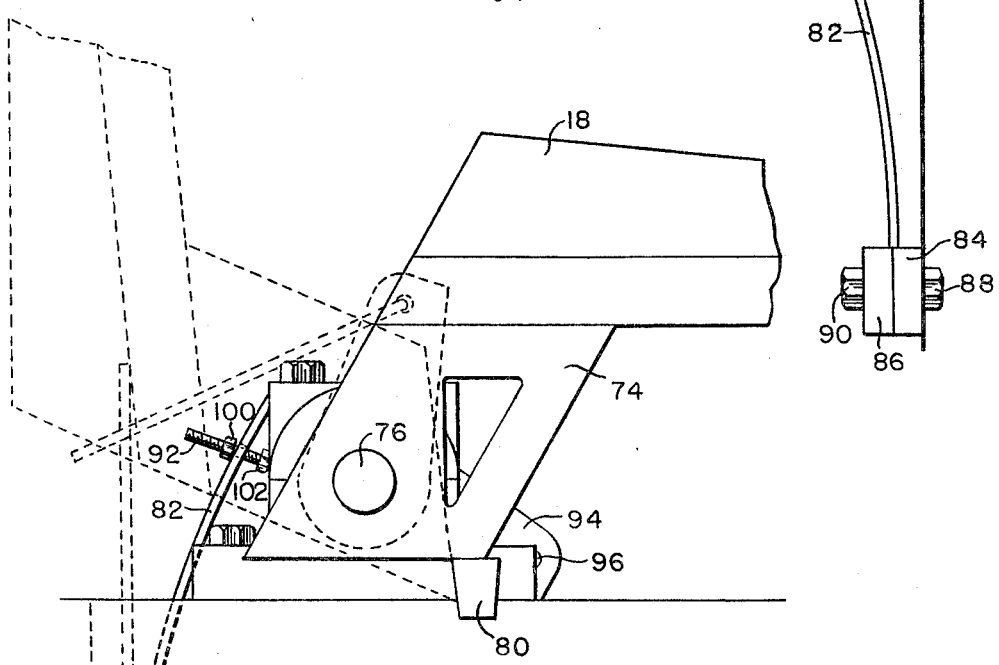

Turning now to FIGS. 3 and 4, the probe arm 18 has a downwardly depending pivot lug 74 which is secured to shaft 76 for pivotal rotation as the shaft 76 rotates in pillow block bearing 78. The mounting position of the pillow block bearing 78 on the upper surface of the cryoscope base 6 is selected so that the axis of shaft 76 is parallel to the front edge of base 6 and lies in a plane which is parallel to the upper surface of the base. This arrangement limits the rotation of the probe arm 18 to a vertical plane which intersects the front and rear surfaces of the cryoscope base 6 at right angles. Obviously, it is not necessary to position shaft 76 parallel to the front and rear edges of the cryoscope base, although this configuration does simplify the problem of locating the probe arm pivot point with respect to the test tube positioning elements. However, the shaft axis must lie in a plane parallel to the upper surface of base 6 to restrict the probe arm rotation to a vertical plane.

The rotation of probe arm 18 within the vertical plane is limited by a stop block 80 which establishes the sample changing and sample measuring positions of the probe arm. Looking at FIG. 4 which depicts one side of the probe arm and pivotal mounting structure, it can be seen that the forward edge of lug 74 rests on the upper surface of stop block 80 when the probe arm 18 is in the sample measuring position indicated by the solid lines in FIG. 4. When the probe arm is rotated upwardly about shaft 76 to the substantially vertical sample changing position shown by the dotted lines in FIG. 4, the rear edge of lug 74 contacts the back surface of stop block 80. The position of stop block 80 can, of course, be varied to change the rotational limits of the probe arm 18.

Up to this point, no mention has been made of the fact that the probe arm 18 is spring-loaded in the preferred embodiment depicted in FIGS. 3 and 4 because the pivotal mounting structure shown therein can be used even though the probe arm is not spring-loaded. Preferably, however, spring tension means for the probe arm 18 are provided to assist the operator in performing the necessary measurement operations.

FIGS. 3 and 4 show the spring tensioning mechanism in side elevation from both sides of the probe arm 18. The tensioning of probe arm 18 is obtained from a strip of spring steel 82 which has one end thereof tightly held between a pair of spring clamping blocks 84 and 86 mounted on base 6 and secured together by fasteners 88 and 90. Spring tension from the strip spring 82 is transmitted to the probe arm 18 through an intermediate spring connecting link 92 and a holding arm 94.

Connecting link 92 is shaped to resemble the letter "J" so that the hooked end of the link (not shown) can be inserted in hole 96 to allow rotation of the connecting link relative to the holding arm 94. The other end of link 92 is free to slide through a slot 98 in the strip spring 82 within the limits imposed by nuts 100 and 102 on the threaded portion of the link. Nuts 100 and 102 provide a means for adjusting the amount of spring tension on the probe arm 18. Thus, if the operator wishes to change the probe arm tension to suit his own personal preferences, it is a relatively simple matter to adjust the setting of nuts 100 and 102.

It can be seen from an inspection of FIGS. 3 and 4 that tension is maintained on the probe arm 18 in all positions of the arm with the exception of the vertical sample changing position indicated by the dotted lines in FIG. 4. Although the probe arm is under spring tension in the horizontal sample measuring position, the tension is offset by the action of the stop block 80. Since the spring tension in this position only forces the probe arm lug 74 more firmly against the fixed stop block 80, the horizontal sample measuring position is referred to as a "neutral" position with respect to spring tension. The probe arm 18 is thus tensioned or spring loaded only between the neutral position of sample changing and sample measuring.

Since numerous modifications of the invention will now be apparent to those skilled in the art, the invention is not intended to be limited to the precise form shown herein, but instead it is to be defined by the scope of the claims appended hereto.

Having thus described and disclosed the preferred embodiments of my invention, what I claim as new and desire to secure by Letters Patent of the United States is:

1. In a freezing point depression apparatus having a base, a coolant container mounted in said base, coolant circulating means and electrical means for measuring the freezing point of a sample solution, the improvement comprising: a probe arm pivotally secured to said base for rotation in a vertical plane; a probe unit comprising a temperature transducer and vibratory stirring means, said probe unit being mounted on the distal end of said probe arm; and means for positioning a cylindrical tube containing said sample solution in said coolant container so that when said probe arm is rotated downwardly said probe unit will be positioned along the axis of said tube and partially immersed in said sample solution without contacting any portion of said tube.

2. In a freezing point depression apparatus having a base, a coolant container mounted in said base, coolant circulating means and electrical means for measuring the freezing point of a sample solution, the improvement comprising: a straight probe arm pivotally secured at one end to said base for rotation in a vertical plane; a probe unit comprising a temperature transducer and vibratory stirring means, said probe unit being mounted on the distal end of said probe arm normal to the axis thereof; stop means for limiting the rotation of said probe arm, said stop means defining a substantially vertical sample changing position and a horizontal sample measuring position for said probe arm; and means for positioning a test tube containing said sample solution in said coolant container so that when said probe arm is rotated downwardly from said sample changing position to said horizontal sample measuring position said probe unit will be positioned along the axis of said test tube and partially immersed in said sample solution without contacting any portion of said tube.

3. In a freezing point depression apparatus having a base, a coolant container mounted in said base, coolant circulating means and electrical means for measuring the freezing point of a sample solution, the improvement comprising: a straight probe arm pivotally secured at one end to said base for rotation in a vertical plane; a probe unit comprising a temperature transducer and vibratory stirring means, said probe unit being mounted on the distal end of said probe arm normal to the axis thereof; stop means for limiting the rotation of said probe arm, said stop means defining a substantially vertical sample changing position and a horizontal sample measuring position for said probe arm; means for spring loading said probe arm between said sample changing and sample measuring positions; and means for positioning a test tube containing said sample solution in said coolant container so that when said probe arm is rotated downwardly from said sample changing position to said horizontal sample measuring position said probe unit will be positioned along the axis of said test tube and partially immersed in said sample solution without contacting any portion of said tube.

4. In a freezing point depression apparatus having a base, a coolant container mounted in said base, coolant circulating means and electrical means for measuring the freezing point of a sample solution, the improvement comprising: a straight probe arm pivotally secured at one end to said base for rotation in a vertical plane; a probe unit comprising a temperature transducer and vibratory stirring means, said probe unit being mounted on the distal end of said probe arm normal to the axis thereof; stop means for limiting the rotation of said probe arm, said stop means defining a substantially vertical sample changing position and a horizontal sample measuring position for said probe arm; means for adjustably spring loading said probe arm between said sample changing and sample measuring positions; and means for positioning a test tube containing said sample solution in said coolant container so that when said probe arm is rotated downwardly from said sample changing position to said horizontal sample measuring position said probe unit will be positioned along the axis of said test tube and partially immersed in said sample solution without contacting any portion of said tube.

5. The apparatus of claim 3 further characterized by means on said probe arm for thermally isolating the open end of said test tube when said probe arm is in the sample measuring position.

6. The apparatus of claim 3 further characterized by said test tube positioning means comprising an annular support for the bottom of said test tube, said support having an inside diameter slightly less than the diameter of said tube whereby the coolant is free to circulate around said tube to provide uniform cooling and means for holding the open end of said tube in fixed relation to said support.

7. The apparatus of claim 3 further characterized by said probe unit vibratory stirring means extending beyond said temperature transducer by a predetermined distance.

References Cited by the Examiner

UNITED STATES PATENTS

| 2,967,424 | 1/1961 | Hoover | 73—17 |
| 3,107,536 | 10/1963 | Ferrari | 73—423 |
| 3,127,773 | 4/1964 | Blumenfeld | 73—423 |

OTHER REFERENCES

Crawford, J. D. et al.: "A Method for the Determination of Freezing Point of Small quantities of Biological Fluids." In the Journal of Laboratory and Clinical Medicine. 40(6): Pages 907–913. December 1952.

RICHARD C. QUEISSER, *Primary Examiner.*

J. C. GOLDSTEIN, *Assistant Examiner.*